US008516591B2

(12) United States Patent
Fly et al.

(10) Patent No.: US 8,516,591 B2
(45) Date of Patent: Aug. 20, 2013

(54) SECURITY MONITORING

(75) Inventors: Robert Fly, Orinda, CA (US); Collin Greene, Palo Alto, CA (US); Brian Soby, Emeryville, CA (US); James Dolph, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 164 days.

(21) Appl. No.: 13/047,549

(22) Filed: Mar. 14, 2011

(65) Prior Publication Data
US 2011/0283356 A1    Nov. 17, 2011

Related U.S. Application Data

(60) Provisional application No. 61/334,312, filed on May 13, 2010.

(51) Int. Cl.
*H04L 29/06* (2006.01)
*G06F 21/00* (2013.01)

(52) U.S. Cl.
USPC .......................................................... 726/24

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |

(Continued)

OTHER PUBLICATIONS

U.S. Office Action dated Nov. 21, 2012 issued in U.S. Appl. No. 13/005,073.
U.S. Office Action dated Apr. 25, 2013 issued in U.S. Appl. No. 13/047,544.
Schneier, Applied Cryptography, 1996, Wiley and Sons, pp. 30-33 and 52-53, 15 pp.

(Continued)

*Primary Examiner* — Gilberto Barron, Jr.
*Assistant Examiner* — David Le
(74) *Attorney, Agent, or Firm* — Weaver Austin Villeneuve & Sampson LLP

(57) ABSTRACT

Disclosed are systems, apparatus, methods, and computer readable media for determining a combined trust level for a website. In one embodiment, a user account associated with the creation or maintenance of the website may be analyzed. The analysis of the user account may be capable of identifying the presence or absence of a first risk factor affecting a likelihood that the user account is engaged in a malicious activity. A source code file capable of being used to create a message for sending to a remote computing device may be analyzed. The analysis of the source code file may be capable of identifying the presence or absence of a second risk factor affecting a likelihood that the source code file is facilitating a malicious activity. Based on the analysis, a combined trust level for the website may be determined.

14 Claims, 7 Drawing Sheets

(56) References Cited

U.S. PATENT DOCUMENTS

| | | |
|---|---|---|
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,775,687 B1 | 8/2004 | Binding et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,100,111 B2 | 8/2006 | McElfresh et al. |
| 7,269,590 B2 | 9/2007 | Hull et al. |
| 7,340,411 B2 | 3/2008 | Cook |
| 7,373,599 B2 | 5/2008 | McElfresh et al. |
| 7,401,094 B1 | 7/2008 | Kesler |
| 7,406,501 B2 | 7/2008 | Szeto et al. |
| 7,454,509 B2 | 11/2008 | Boulter et al. |
| 7,599,935 B2 | 10/2009 | La Rotonda et al. |
| 7,603,331 B2 | 10/2009 | Tuzhilin et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,827,208 B2 | 11/2010 | Bosworth et al. |
| 7,853,881 B1 | 12/2010 | Aly Assal et al. |
| 7,890,766 B2 | 2/2011 | Girouard et al. |
| 7,945,653 B2 | 5/2011 | Zuckerberg et al. |
| 8,005,896 B2 | 8/2011 | Cheah |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,204,906 B2 | 6/2012 | Dettinger et al. |
| 8,209,333 B2 | 6/2012 | Hubbard et al. |
| 8,275,836 B2 | 9/2012 | Beaven et al. |
| 8,316,051 B1 | 11/2012 | Burns et al. |
| 2001/0044791 A1 | 11/2001 | Richter et al. |
| 2002/0002586 A1 | 1/2002 | Rafal et al. |
| 2002/0072951 A1 | 6/2002 | Lee et al. |
| 2002/0082892 A1 | 6/2002 | Raffel |
| 2002/0099936 A1 | 7/2002 | Kou et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0126463 A1 | 7/2003 | Sistla |
| 2003/0147392 A1 | 8/2003 | Hayashi et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0255161 A1* | 12/2004 | Cavanaugh ................ 713/201 |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0138413 A1 | 6/2005 | Lippmann et al. |
| 2007/0244855 A1* | 10/2007 | Bates ............................. 707/3 |
| 2007/0300298 A1* | 12/2007 | Goranson et al. ............. 726/22 |
| 2008/0022407 A1* | 1/2008 | Repasi et al. ................. 726/25 |
| 2008/0091750 A1 | 4/2008 | Zadrozny et al. |
| 2008/0189788 A1* | 8/2008 | Bahl ............................ 726/25 |
| 2008/0209503 A1* | 8/2008 | Hess et al. ..................... 726/1 |
| 2008/0289047 A1* | 11/2008 | Benea et al. ................. 726/27 |
| 2009/0007271 A1* | 1/2009 | Huang et al. ................ 726/26 |
| 2009/0063415 A1 | 3/2009 | Chatfield et al. |
| 2010/0146269 A1 | 6/2010 | Baskaran |
| 2011/0078197 A1 | 3/2011 | Zurko et al. |
| 2011/0161289 A1 | 6/2011 | Pei et al. |
| 2011/0282908 A1 | 11/2011 | Fly et al. |
| 2011/0283110 A1 | 11/2011 | Dapkus et al. |
| 2012/0290407 A1 | 11/2012 | Hubbard et al. |

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

* cited by examiner

SECURITY MONITORING

PRIORITY AND RELATED APPLICATION DATA

This application claims priority to Provisional U.S. Patent App. No. 61/334,312, filed on May 13, 2010, entitled "Methods and Systems for Identifying Malicious Code in an On-demand Service Environment", by Dapkus et al., which is incorporated herein by reference in its entirety and for all purposes.

TECHNICAL FIELD

The present disclosure relates generally to on-demand services provided over a data network such as the Internet, and more specifically to security monitoring.

BACKGROUND

Organizations typically employ many different types of software and computing technologies to meet their computing needs. However, installing and maintaining software on an organization's own computer systems may involve one or more drawbacks. For example, when software must be installed on computer systems within the organization, the installation process often requires significant time commitments, since organization personnel may need to separately access each computer. Once installed, the maintenance of such software typically requires significant additional resources. Each installation of the software may need to be separately monitored, upgraded, and/or maintained. Further, organization personnel may need to protect each installed piece of software against viruses and other malevolent code. Given the difficulties in updating and maintaining software installed on many different computer systems, it is common for software to become outdated. Also, the organization will likely need to ensure that the various software programs installed on each computer system are compatible. Compatibility problems are compounded by frequent upgrading, which may result in different versions of the same software being used at different computer systems in the same organization.

Accordingly, organizations increasingly prefer to use on-demand services accessible via the Internet rather than software installed on in-house computer systems. On-demand services, often termed "cloud computing" services, take advantage of increased network speeds and decreased network latency to provide shared resources, software, and information to computers and other devices upon request. Cloud computing typically involves over-the-Internet provision of dynamically scalable and often virtualized resources. Technological details can be abstracted from the users, who no longer have need for expertise in, or control over, the technology infrastructure "in the cloud" that supports them.

BRIEF DESCRIPTION OF THE DRAWINGS

The included drawings are for illustrative purposes and serve only to provide examples of possible structures and process steps for the disclosed inventive systems and methods for providing services to remote clients. These drawings in no way limit any changes in form and detail that may be made to embodiments by one skilled in the art without departing from the spirit and scope of the disclosure.

DETAILED DESCRIPTION

Figure 1:
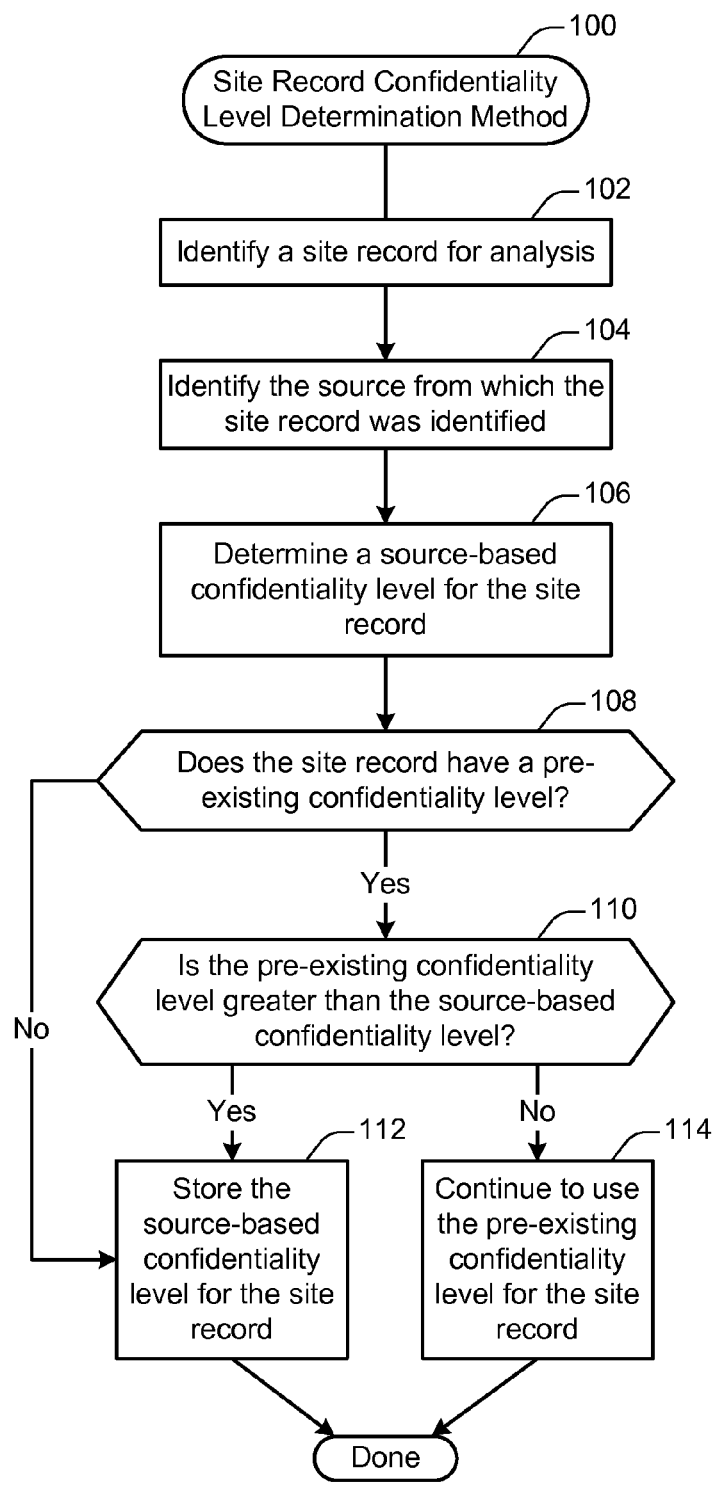
FIG. 1 shows a flow diagram of a method 100 for determining a confidentiality level in a site record, performed in accordance with one embodiment.

Applications of systems and methods according to one or more embodiments are described in this section. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers.

In some embodiments, techniques disclosed herein may be used to maintain the confidentiality and security of systems, websites, processes, and information provided by, hosted at, or stored at computing devices associated with an on-demand service provider. The on-demand service provider may provide on-demand computing services to entities in communication with the on-demand service environment.

In some embodiments, techniques disclosed herein may be used to maintain the confidentiality of information when using various analysis tools to monitor websites, computing services, and other sites provided by a network service provider. Site records for such sites may be identified from a variety of public, private, and protected sources. The site records may include information of varying degrees of confidentiality, including private information, quasi-private information, quasi-public information, and public information. The site records may be subjected to various analysis tools and techniques, at least some of which may be provided by services or sources external to the on-demand service provider. At least some of these services may not be fully trusted by the service provider with at least certain types of confidential information.

In some embodiments, techniques disclosed herein may be used to identify a potentially malicious website hosted by the service provider. A common problem for web hosting providers is dealing with websites that are created to deliver malicious content to host computers, conduct phishing attacks, or perform other types of malicious activities. In some embodiments, a combination of blacklist analysis, heuristic analysis, reputation analysis, and backend analysis may be used to determine a likelihood that a website is engaged in malicious activities.

In some embodiments, techniques disclosed herein may be used to ensure or determine trust in language translation and other types of transformations of structured resources. Structured or formatted documents or resources such as webpages may need to be transformed or altered. For example, a webpage may be translated from one written language to another written language. In some instances, a webpage may be sent to an external service for transformation. The external services may not be controlled by or fully trusted by the on-demand service provider. However, written language translation or other transformation may occur after content has been processed into a format that include both content and control elements. For example, some formats like HTML include active code elements with control portions that are not visible apparent but that could potentially perform malicious actions. If a resource is transmitted to an untrusted party for translation, the untrusted party can perform malicious alteration of the invisible control portions along with the language translations. These changes could then perform malicious actions after inclusion of the resource into a larger software system or website.

FIG. 1 shows a flow diagram of a method 100 for determining a confidentiality level in a site record, performed in accordance with one embodiment. In some implementations, an on-demand service provider may evaluate site records associated with sites accessible via the on-demand computing services. These sites may include computer systems, programs, configurations, web sites, or any other computing services constructs.

In some embodiments, the site records may include any information about the sites. For instance, the site records may include URLs leading to the sites, cached copies of sites, backend logs associated with the sites, IP addresses leading to the sites, internal audit trails of site creation or access, or any other site-related information.

In some implementations, the on-demand service may evaluate site records for various reasons. For instance, the on-demand service provider may seek to identify malicious or prohibited sites. As another example, the on-demand service provider may seek to identify sites that are inadvertently leaking private information. As yet another example, the on-demand service provider may seek to identify sites that have been hijacked, altered, or otherwise attacked by malicious entities.

In some implementations, site records can contain sensitive information such as URL parameters, database keys, usernames, passwords, customer information, addresses, social security numbers, and various other types of information. In some embodiments, the on-demand service provider may be explicitly or implicitly obliged to maintain the confidentiality of such information. The information may include information private to the on-demand service provider itself or information private to entities accessing computing services provided by the on-demand service provider In some embodiments, the degree of confidentiality that information contained in site records is afforded by the on-demand service provider may be based at least in part on where the information is discovered. For instance, data discovered in internal server logs or audit trails may be afforded a relatively high level of confidentiality unless there exists some reason to believe that the information is not sensitive. As another example, data discovered via a search conducted with a public search engine such as Google® may be afforded a relatively low level of confidentiality since the information is publicly accessible.

Many techniques and tools for analyzing site records exist. In some implementations, some tools may be controlled by the on-demand service provider. However, techniques for detecting malicious or prohibited software may include sending information to external services. These external services may not be under the control of the on-demand service provider.

Further, the external services may be trusted to varying degrees by the on-demand service provider and/or entities accessing the on-demand services. For instance, some services may be provided by entities the service provider has reasons to trust. These trusted entities may include entities with which the service provider has had a long relationship, entities that are publicly well-known and well-regarded, or entities that can provide assurances that they are capable of securely handling confidential information. However, some services may be provided by entities the service provider has little reason to trust. These untrusted entities may include entities with which the service provider has not had a long relationship, entities that are relatively unknown, or entities that are unable to make assurances regarding the handling of confidential information.

In some embodiments, an external service may be assigned a trust level. The trust level may indicate the degree to which the external service is trusted by the on-demand service provider, an entity accessing services provided by the service provider, or some other entity.

In some embodiments, the trust level for an external service or other analysis tool may be compared with a confidentiality level of a site record to determine whether the site record may be sent to the analysis tool. Techniques for using a confidentiality level for a site record are discussed in further detail with respect to FIG. 2.

Figure 2:
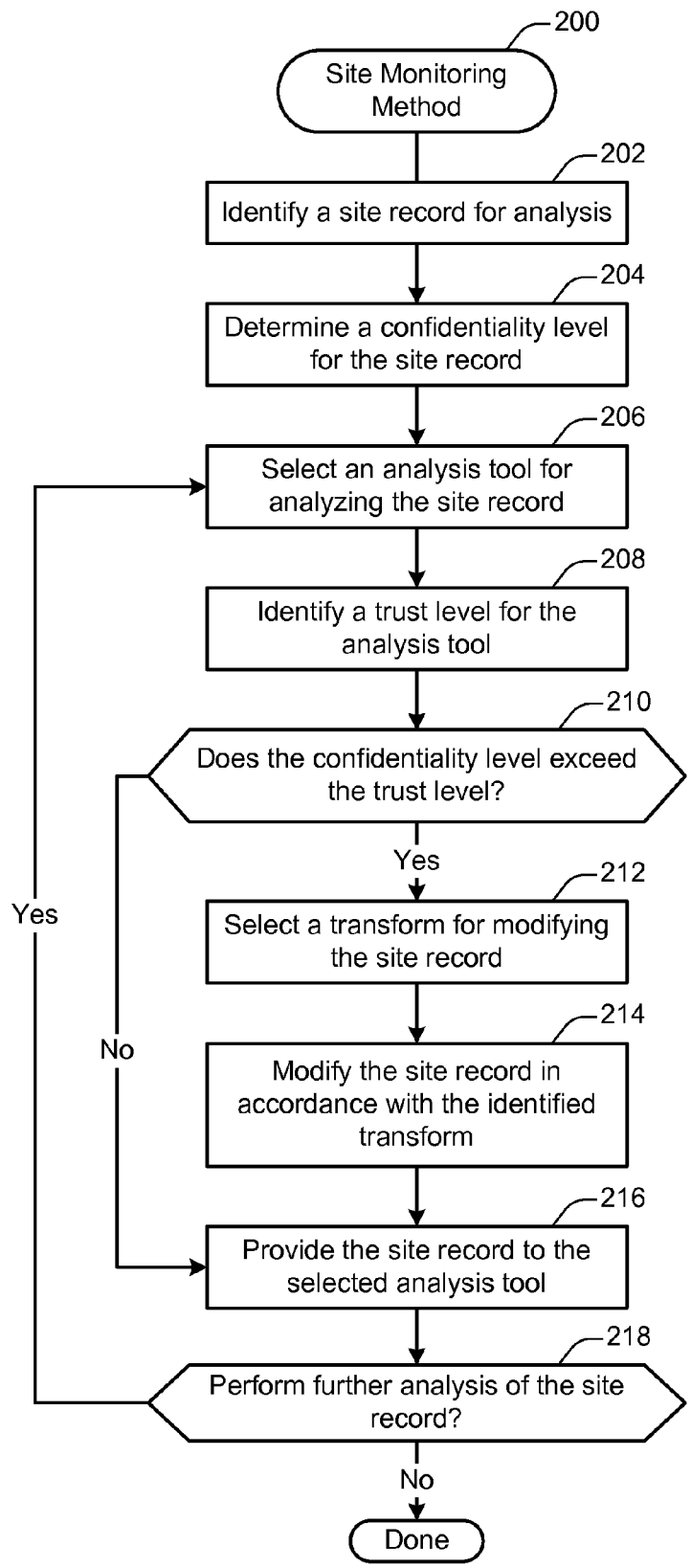
FIG. 2 shows a flow diagram of a method 200 for monitoring a site, performed in accordance with one embodiment.

In some embodiments, a confidentiality level for a site record may be used for various purposes, including purposes not discussed with respect to FIG. 2. For example, a confidentiality level for a site record may be used to determine when private information is being leaked, to notify users or entities accessing the on-demand service environment that confidential information has been leaked, or for any other reason.

In some embodiments, the method 100 may be performed at one or more computing devices operating in an on-demand service environment. For example, one or more operations may be performed at app servers 588 or batch servers 584 shown in FIG. 5B. As another example, one or more operations may be performed by a server not shown in FIG. 5B. In some implementations, operations may be performed on the same physical computing device or at different physical computing devices operating in concert.

In some embodiments, the method 100 may be performed periodically. For example, the method 100 may be periodically performed to analyze a variety of site records identified through various techniques. The method 100 may be run according to any schedule, such as once per second, once per day, once per week, etc.

In some embodiments, the method 100 may be performed when a triggering event is detected. For example, a new site record may be discovered via some source. As another example, a site record may be selected for transmitting to an external service or other analysis tool for analysis. In these cases, the site record confidentiality level may be determined prior to submitting the site record for analysis.

In some embodiments, a monitoring process may periodically analyze various sources to search for site records. For example, a monitoring process may periodically check internal server logs, conduct searches via public search engines, analyze communications received by the on-demand service provider, or otherwise search or monitor information sources for site records.

At 102, a site record is identified for analysis. In some implementations, sites may include any computer systems, programs, configurations, web sites, or any other computing services constructs. In some instances, a site may be associated with a network address, such as an IP address, a URI, a URL, or a different type of identifier. In other instances, more than one site may be accessed at a single network location, such as a portal. In still other instances, a site may not be publicly accessible via a network and/or may include private information internal to the service provider.

In some embodiments, the site associated with the identified site record may be provided by the on-demand service provider. Alternately, the site may be provided at least in part by an entity accessing the on-demand service provider, while the on-demand service provider may provide hosting functionality or storage space for the site. In either case, the on-demand service provider may have access to private or protected information concerning the site, such as server logs, source code, non-public data, or other such information.

In some embodiments, a site record may include any information related to a website or service provided by the on-demand service provider, alone or in conjunction with an entity accessing on-demand services provided by the on-demand service provider. For instance, the site record may include a URL leading to a site, a cached copy of a site, backend logs associated with the site, an IP address leading to the site, internal audit trails of site creation or access, or any other contextual information or record information associated with the site.

At 104, the source from which the site record was identified is identified. In some implementations, site records may be identified in a variety of ways and from a variety of sources. In some instances, site records may be identified via internal sources such as server logs, audit trails of site creation or access, or other internal information. In other cases, site records may be identified via external sources such as an Internet search engine, a World Wide Web spider cache, a public network such as the Internet, or a publicly available information cache or repository. In yet other instances, site records may be identified from communications received by the service provider from external sources. These communications may include e-mails, SOAP messages, text messages, or any other forms of communication.

At 106, a source-based confidentiality level for the site record is determined. In some embodiments, the source-based confidentiality level may be determined by comparing the source of the site record to a list of designated confidentiality levels for site record sources. Alternately, or additionally, a source type may be determined. The source type may reflect information such as whether the source is internal or external to the service provider, whether the source is publicly accessible or privately accessible, whether the source is accessible to an entity accessing the on-demand service provider, or any other classification information.

In some embodiments, site records may be assigned confidentiality levels of high, medium, low, and none based on the source through which they are identified. However, these specific classifications need not be used in each embodiment. Instead, a classification scheme for confidentiality levels may be strategically determined based on factors such as the types of sources that are used to discover site records, the confidentiality needs and obligations of the on-demand service provider, the confidentiality needs and obligations of entities accessing computing services via the on-demand service provider, and any other relevant information.

In some embodiments, site records discovered via certain sources may be assigned a relatively high level of confidentiality. Sources that may lead to a site record being assigned a relatively high level of confidentiality may include internal server logs, internal audit records, any information known or believed to be covered by an explicit or implicit confidentiality obligation, or any other information known or believed to be private or sensitive.

In some embodiments, site records discovered via certain sources may be assigned a medium level of confidentiality. Sources that may lead to a site record being assigned a medium level of confidentiality may include communications such as e-mails received by the on-demand service provider, information sources believed to possibly contain confidential information, and information sources not explicitly confidential but carrying an implicit obligation of confidence or trust.

In some embodiments, site records discovered via certain sources may be assigned a relatively low level of confidentiality. Sources that may lead to a site record being assigned a low level of confidentiality may include a public network such as the Internet, a public search engine such as Google®, and information believed (but not known) to not be covered by any obligation of confidentiality.

In some embodiments, site records discovered via certain sources may be assigned a confidentiality level of none. Sources that may lead to a site record being assigned a relatively high level of confidentiality may include any sources known to be public or unrestricted, such as information published by the on-demand service provider, information available via public news sources, information evaluated and identified as public by the on-demand service provider, information evaluated and identified as public by an entity accessing computing services via the on-demand service provider, and any other information known to be public.

In some embodiments, a site record discovered from a site not covered by any other category may be assigned a default confidentiality level. In some implementations, the default level of confidentiality may be relatively high in order to avoid inadvertently releasing public information. Alternately, the default level of confidentiality may be relatively low if most information discovered in this way is believed to not be confidential.

At 108, a determination is made as to whether the site record has a pre-existing confidentiality level. In some embodiments, the determination made at 108 may be made at least in part by accessing a storage device, such as the storage systems 622 or 624 shown in FIG. 6.

In some embodiments, a pre-existing confidentiality record may have been stored in a previous iteration of the method 100. For example, the pre-existing confidentiality record may have been stored at operation 112 shown in FIG. 1. Alternately, or additionally, a pre-existing confidentiality record may have been assigned in some other fashion. For instance, certain types of site records may be associated with a default, minimum, or maximum confidentiality level. As another example, a previous analysis of the site record may have resulted in a confidentiality level being assigned based on content included in the site record, such as internal database keys.

At 110, a determination is made as to whether the pre-existing confidentiality level is greater than the source-based confidentiality level. In some implementations, as shown in FIG. 1, the lower of the two confidentiality levels should govern. For example, suppose that a site record has a relatively high source-based confidentiality level because the site record was retrieved from an internal log. However, also suppose that the site record has a low pre-existing confidentiality level because it was previously retrieved from a publicly accessible source such as an Internet search engine. In this case, assigning the site record a high confidentiality level may not reflect its publicly accessible nature.

Alternately, the higher of the two confidentiality levels may govern in at least some instances. For example, a site record containing private information may have been inadvertently leaked and discovered via a public source such as an Internet search engine. In this case, if the information has not been widely shared or accessed, a request to remove the private information may be sent to the search engine. Thus, the relatively higher confidentiality level may in some cases be maintained.

At 112, the source-based confidentiality level for the site record is stored. In some embodiments, the source-based confidentiality level may be stored if the site record has no pre-existing confidentiality level, if the pre-existing confidentiality level is greater than the source-based confidentiality level, or if some other condition is met.

Figure 6:
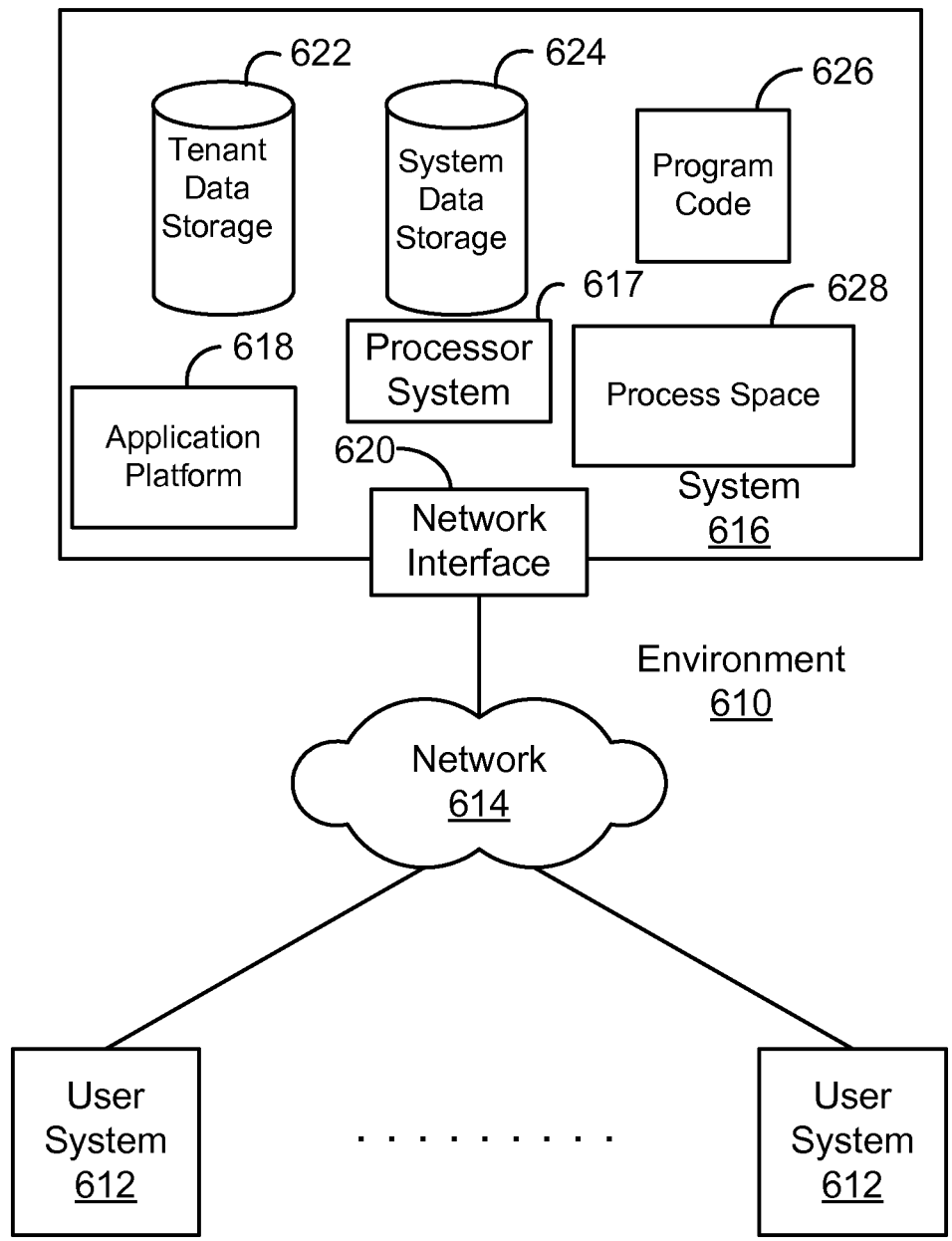
FIG. 6 shows a system diagram 610 illustrating the architecture of a multitenant database environment, in accordance with one embodiment.

In some embodiments, storing the source-based confidentiality level may be performed at least in part by recording a value at a storage system, such as the storage systems 622 or 624 shown in FIG. 6. In some embodiments, information other than the source-based confidentiality level may also be stored. The other information that may be stored may include, but is not limited to: the source on which the confidentiality level is based, a date or time at which confidentiality analysis was last conducted, and/or any other contextual information for the site record.

At 114, the use of the pre-existing confidentiality level for the site record is continued. In some embodiments, continuing to use the pre-existing confidentiality level may not require any explicit operations. Since the pre-existing confidentiality level has been stored in an accessible manner, updating the stored confidentiality level may not be required. Alternately, one or more operations may be performed for updating contextual information related to the site record confidentiality level. For instance, a date or time at which the confidentiality level was last evaluated for the site record may be updated.

FIG. 2 shows a flow diagram of a method 200 for monitoring a site, performed in accordance with one embodiment. In some embodiments, the method 200 may be used to facilitate the analysis of data by one or more analysis tools.

In some embodiments, the data may include site records, which may include information such as URIs. Data may be associated with a confidentiality level, and an analysis tool may be associated with a trust level. In some instances, the confidentiality level for data may exceed the trust level of an analysis tool selected for analyzing the data.

In some embodiments, the sensitivity of the source for and/or contents of a site record may be determined. This sensitivity may be compared to the sensitivity of a tool to be used in its analysis. If the site record is more sensitive than the analysis tool to be used, the site record may be subjected to one or more sanitizing transforms that can be applied to the site record to downgrade the sensitivity level to the trust level of the tool. Such transforms can include the removal of parameters meeting certain patterns like social security numbers, scrambling or randomizing data, changing timestamps, or any other type of modification.

However, some sites may require certain inputs to function properly. Thus, at least some transforms may recognize key inputs to sites and apply specialized techniques to maintain site function. For instance, a URI may include confidential information as parameter values. In this case, simply removing the confidential information may result in the analysis tool being unable to fulfill the function requested of it. To avoid such a situation, the site record may be transformed so that less confidential information is included in the site record. For example, a default social security number such as 000-00-0000 may be substituted for an actual social security number associated with a real individual. In this case, the analysis tool can perform the requested analysis using the sample social security number.

At 202, a site record is identified for analysis. In some embodiments, operation 202 may be substantially similar to operation 102 discussed with respect to FIG. 1. In some embodiments, a site record may include any information related to a website or service provided by the on-demand service provider, alone or in conjunction with an entity accessing on-demand services provided by the on-demand service provider. For instance, the site record may include a URL leading to a site, a cached copy of a site, backend logs associated with the site, an IP address leading to the site, internal audit trails of site creation or access, or any other contextual information or record information associated with the site.

In some embodiments, site records may be identified by searching or analyzing public information, such as World Wide Web spider caches, Internet search engines, or public repositories of information. Alternately, or additionally, site records may be identified by searching or analyzing private information such as server logs, audit trails, or source code. Alternately, or additionally, a list of site records may be maintained and periodically analyzed.

At 204, a confidentiality level for the site record is identified. In some embodiments, the confidentiality level for the site record may include a level selected from the levels described with respect to FIG. 1. Alternately, or additionally, other confidentiality levels may be used. The type of confidentiality levels to assign to site records may be strategically determined based on factors such as a desired level of security, the types of information that need to be protected, and the security needs of entities accessing computing services via the on-demand computing services environment.

In some embodiments, the confidentiality level for the site record may be determined based on a source of the site record. In this case, the confidentiality level may be determined using the techniques discussed in relation to FIG. 1 or using other source-based confidentiality level determination techniques.

In some embodiments, the confidentiality level for the site record may be determined based on the content of the site record. For example, the site record may be analyzed to determine whether any of the information contained therein includes private information such as usernames, passwords, social security numbers, or addresses.

In some embodiments, the confidentiality level for the site record may be determined using a combination of content-based and source-based analysis. For instance, a site record that includes a social security number may be indicated as having a relatively high confidentiality level regardless of the source from which it was located. As another example, a site record identified via a known public source such as a public news service may be identified as having a relatively low confidentiality level regardless of the information contained therein.

At 206, an analysis tool for analyzing the site record is selected. In some embodiments, analysis tools may perform various operations for analyzing the site record. For example, the analysis tool may perform a security analysis of a site record that includes a URL of a website hosted by the service provider. The analysis performed by the analysis tool may include, but is not limited to, any or all of the following examples. First, an analysis tool may hash a URL or other value and compare the hashed value against a table of hash values of URLs known to be associated with malicious activity. Second, an analysis tool may compare an e-mail address associated with the site record with a blacklist of known bad e-mail senders such as spammers. Third, an analysis tool may attempt to connect with a URL using secure communications and determine whether the attempt is successful. Fourth, an analysis tool may access a URL with a vulnerable web browser such as an unpatched version of Internet Explorer® 6.0 and then determine whether any of the web browser's vulnerabilities have been exploited. Fifth, an analysis tool may compare a URL against a cache of spidered websites to determine an age of the website associated with the URL.

At 208, a trust level for the analysis tool is identified. In some embodiments, the trust level for the analysis tool may correlate with a confidentiality level associated with information, as discussed with respect to operation 106 in FIG. 1. That is, the trust level for the analysis tool may be determined to be a value selected from high, medium, low, and none. Alternately, the trust level for the analysis tool may be a value selected from a different confidentiality/trust scale.

In some embodiments, the trust level for the analysis tool may be determined by retrieving the trust level from a list of predetermined trust levels. These trust levels may be assigned by a user such as an administrator. Alternately, the trust level for the analysis tool may be determined at least in part by analyzing a source or owner of the analysis tool. For example, analysis tools internal to the service provider may be afforded a high-level of trust, analysis tools associated with trusted associates of the service provider may be afforded a medium level of trust, and analysis tools associated with relatively unknown parties may be afforded no trust.

At 210, a determination is made as to whether the confidentiality level exceeds the trust level. In some embodiments, a determination that the confidentiality level of the identified information exceeds the trust level of the selected analysis tool may indicate that the identified information should not be sent to the selected confidentiality tool. For example, the information may include private user data such as usernames and passwords, and the analysis tool may be provided by an external service associated with a relatively unknown or untrusted service provider.

At 212, a transform for modifying the site record is selected. The transform may perform any operations for reducing the confidentiality level of the information contained in the site record. The transforms may hash, encrypted, alter, replace, supplement, eliminate, scramble, randomize, or otherwise modify the information contained in the site record so that the site record may be safely provided to the analysis tool identified at operation 208.

In some embodiments, the types of modifications performed by a transform may include, but are not limited to: modifying social security numbers, modifying identifiers not provided by the on-demand service environment, modifying based on regular expressions, modifying usernames, modifying passwords, modifying timestamps, modifying parameters, and/or modifying parameter values. Such modifications can include removing, replacing, or altering the modified information. In some embodiments, URIs may be modified to eliminate parameters or parameter values, eliminate all information except a host name, eliminate all information except an IP address, or eliminate any other information. In some embodiments, a transform may modify a communication protocol, such as by changing a Secure Sockets Layer (SSL) URI to a hyper text transport protocol (HTTP) URI.

In some embodiments, the transform may be selected at least in part on the basis of a desired reduction in confidentiality level. For example, some transforms may be designated as being operable to reduce the confidentiality level of a site record from high to medium, from high to low, from high to none, from medium to low, from medium to none, from low to none, or to perform any other reduction.

In some embodiments, two or more transforms may be selected in order to effect a greater reduction in confidentiality level. For example, a first transform may be selected to reduce the confidentiality level from high to medium, and a second transform may be selected to reduce the confidentiality level from medium to low. As another example, reducing the confidentiality level from high to medium may involve selecting two or more different transforms. In some embodiments, the specific techniques for providing and selecting the transforms may be strategically selected based on factors such as the nature of the modification that is to be performed, the desired reduction in confidentiality level the type of information that is to be transformed, and any other considerations.

At 214, the site record is modified in accordance with the selected transform. As discussed with respect to operation 212, modifying the site record may include any operations for reducing the confidentiality level of the information included in the site record. These operations may remove confidential information, replace confidential information with less confidential information, encrypt or hash confidential information, or perform any other modification.

In some embodiments, the transform may recognize inputs required for the function of some sites. The transform may apply specialized techniques to reduce the confidentiality of required information while maintaining site functions. For instance, the transform may substitute generic information for personalized information.

At 216, the site record is provided to the analysis tool. In some embodiments, providing the site record to the analysis tool may involve transmitting the site record to an external service, sending the site record as input to an internal service or process, or storing the site record in a location where it can be retrieved by the analysis tool. The specific technique used to provide the site record to the selected analysis tool may be strategically determined based on the method of communicating with and/or activating the selected analysis tool.

At 218, a determination is made as to whether to perform further analysis of the site record. In some embodiments, a determination that the site record is to be subjected to further analysis may result in one or more of operations 206-218 being repeated. Further analysis of the site record may include analysis by analysis tools different than that originally selected at operation 206. These different analysis tools may have trust levels different than that of the original analysis tool.

In some cases, the different analysis tools may have lower trust levels than the original analysis tool. In these cases, the site record may be subjected to further transforms in order to protect the confidentiality of the information contained in the site record. Alternately, the different analysis tools may have higher trust levels than the original analysis tool. In these cases, information removed, replaced, or obfuscated by the transformation at operation 214 may be replaced or transformed in a different way in order to provide the newly selected analysis tools with more information for analysis.

In some embodiments, analysis tools may be selected in decreasing order of trust. In this way, the site record may be progressively transformed to have ever lower confidentiality levels to correspond with the progressively lower trust levels without needing to revert to a higher confidentiality level. Alternately, analysis tools may be selected in a different order.

In some embodiments, the determination made at 218 may be based at least in part on the results of the analysis performed by the analysis tool selected at operation 206. For instance, the analysis tool may indicate that the site record indicates possible problems with the site, but that further analysis is necessary to confirm the problems.

In some embodiments, the determination made at 218 may not be based on the results of the analysis performed by the analysis tool. For example, the site record may be subjected to analysis by a number of different analysis tools regardless of the outcome of each analysis.

Figure 3:
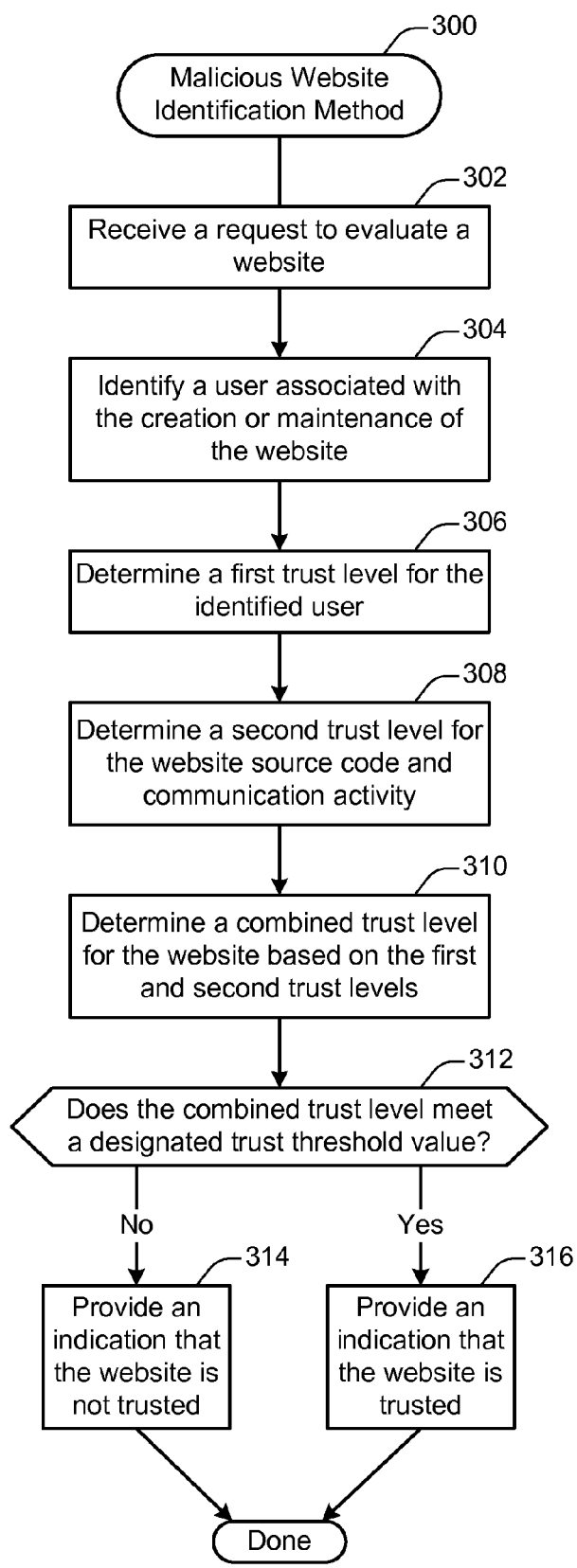
FIG. 3 shows a flow diagram of a method 300 for identifying a potentially malicious website, performed in accordance with one embodiment.

FIG. 3 shows a flow diagram of a method 300 for identifying a potentially malicious website, performed in accordance with one embodiment. A common problem for web hosting providers is dealing with websites that are created to perform malicious activities. For example, a malicious website may be created to deliver malicious content such as viruses, worms, Trojans, and other malicious software to host computers. As another example, a type of malicious website known as a phishing site may be created to trick users into divulging private information. Quick identification and takedown of these sites has become paramount to maintaining trust on public networks such as the Internet.

In some implementations, the method 300 may be applied in environments where websites may be cheaply or freely created by users who may or may not be known to the hosting service provider. In such environments, malicious websites may be created in a very short amount of time and, once their activities are completed, may be removed in a very short amount of time.

In some implementations, the method 300 may be used to detect a malicious website within a short period of time after the creation of the website. For example, in some instances a malicious website may be detected in a matter of minutes after its creation. However, in some instances detecting a malicious website may take a longer amount of time.

In some embodiments, the detection of potentially malicious websites is performed at least in part via blacklists. Blacklists may identify known malicious software download sites and known bad phishing sites. However, blacklists may not protect against unknown or undiscovered malicious websites. Some malicious websites may take days or weeks to be identified as such by security vendors and placed on blacklists, or may never be identified.

In some embodiments, the detection of potentially malicious websites is performed at least in part via heuristics. Heuristics may include techniques for investigating links for obfuscated URLs, references to corporate images on domains which they do not own, analysis of page content to determine if it was stolen from another domain, and other analysis tools. However, many currently available heuristics tools are designed to work on websites in which backend server information such as communication logs and source code are unavailable for analysis.

In some embodiments, reputation analysis may be used to determine a trust level for a user (e.g., an administrator) associated with a website. Reputation analysis may take into account a user's past activity, such as other websites created by the user.

In some embodiments, backend analysis may be used to determine a more direct trust level for a website. The backend analysis may analyze server-side source code, client-side source code, communication logs, and other metadata to help in identifying potentially malicious websites.

The method 300 may be used to automatically identify potentially malicious websites. This identification may be based on an analysis of a user associated with the creation or maintenance of the website, a backend analysis of the source code used to generate the website, and/or a backend analysis of communications conducted by the website.

At 302, a request to evaluate a website is received. In some embodiments, the request may be received at a computing device. The computing device may be associated with the web hosting service provider. The computing device may be used to analyze websites hosted at the hosting provider for malicious activity.

In some embodiments, the request to evaluate the website may be received based on an indication that the website is possibly malicious. For instance, a user such as an administrator may flag a website as being possibly malicious.

In some embodiments, the request to evaluate the website may be received as part of a regular analysis procedure. For example, the hosting provider may periodically evaluate each or some of the websites hosted at the hosting provider to determine whether the websites are potentially malicious. This analysis may occur every hour, every day, several times a day, or at any other time interval.

In some embodiments, the request to evaluate the website may be generated based on a detected or automated event. For example, a website may be automatically evaluated when it is created, when a designated time has elapsed since the creation of the website, when a designated traffic threshold for the website has been surpassed, or when any other designated event is detected.

At 304, a user associated with the creation or maintenance of the website is identified. In some embodiments, the user may be identified by a user account at the hosting provider. For example, the user account may include a username and password for logging in to the hosting provider, for accessing billing information related to the web hosting services, or for accessing backend components associated with the webpage. Alternately, or additionally, a user may be identified by some other technique, such as by analyzing an IP address associated with a network connection used to access the hosting provider.

In some instances, the user may be identified based on the creation or ownership of the web site being analyzed. For instance, the user may be identified by a user account used to create the website. Alternately, the user may be identified based on the editing or maintenance of the website. For instance, one user may have created the website, while another user may log on to edit the website or view backend information such as logs or records. In some embodiments, any or all of the users linked to the website being analyzed may be used for trust analysis.

At 306, a first trust level for the identified user is determined. In the examples described herein, higher levels of trust mean that a user is more likely to be trustworthy and less likely to create a malicious website. However, in some embodiments, a risk level may be used in place of the trust level, and a higher risk level may indicate that the user is more likely to create a malicious website.

In some embodiments, a mathematical formula or procedure for determining a trust level for a user may be strategically determined based on factors such as the age of the hosting system hosting the website, the length of time the hosting system has been used by users, the data available to the hosting provider, the types of websites hosted by the hosting provider, and other factors. In some embodiments, one or more of the following considerations may be used to determine a trust level for the identified user.

In some embodiments, new users who have recently registered with the hosting provider and who have not been identified as having created other websites may be assigned a neutral or zero level of trust, since very little may be known about new users.

In some embodiments, a higher level of trust may be afforded to users with accounts active for a greater length of time. In many cases, a user creating a malicious website has not been registered with the hosting provider for more than a few days or weeks. Thus, a user account older than a designated length of time (e.g., 6 months), may be afforded a higher level of trust. In some embodiments, the trust level afforded to the user may increase as a function of the age of the user's account.

In some embodiments, a higher level of trust may be afforded to active users of the system. In many cases, a user creating a malicious website will not conduct much activity with the hosting provider after establishing a new website and uploading malicious website code to the server. Thus, an active user may be more trustworthy. In some embodiments, activity may be measured by the number or frequency of changes to the website source code, a number or frequency of logins by the user. Alternately, or additionally, activity may be measured by usage of features provided by the hosting provider that would likely not be necessary to use if the user were creating a malicious website. These features may include the creation of custom database objects, the use of customer relations management (CRM) features, or the creation of workflows.

In some embodiments, a higher level of trust may be afforded to users based on the past creation of other websites. In many cases, a user creating malicious websites often may not also create non-malicious websites. As more time elapses since a malicious website was created, the website is more likely to be identified as malicious. Accordingly, a user who has created or modified websites that are older than a designated period of time and that have not been identified as malicious or untrustworthy may be afforded a higher level of trust. In some embodiments, a threshold (e.g., 90 days) may be established for using past-created websites to increase a user's trust score. That is, the development of websites prior to 90 days before the trust evaluation may lead to a higher level of trust, while the development of websites after 90 days before the trust evaluation may not lead to a higher level of trust. Alternately, or additionally, a trust level of the user may increase as a function of the age, number, and trust level of the past websites the user has created.

In some embodiments, a lower level of trust may be afforded to a user who is associated with potentially malicious activity. In a first example, if the user is detected as editing a website that is deemed untrustworthy, then the user's trust level may be lowered. In a second example, if the user connects to the web host from an IP address or other network location known or believed to be associated with malicious activity, then the user's trust level may be lowered. In a third example, if the user connects to the web host via a suspected "user agent" identified via an HTTP header, then the user's trust level may be lowered. In a fourth example, a user may be assigned a lower trust level based on a heightened request frequency, which may indicate the use of a program (which may also be known as a "bot" in this context) in connecting with the web host. In a fifth example, if the user fails a human verification test such as providing a correct response to a "captcha" phrase, which may also indicate the use of a bot, then the user's trust level may be lowered.

In some embodiments, operations 304 and 306 may be repeated if more than one user is identified. For instance, one user identified in the hosting system may have created the website, while several other users may have been given permission to create or edit the website.

At 308, a second trust level is determined. The second trust level may be based on the website source code, on communication conducted by the hosted website, on other backend considerations, or on some combination thereof.

In the examples described herein, higher levels of trust mean that a website is more likely to be trustworthy and less likely to be malicious. However, in some embodiments, a risk level may be used in place of the trust level, and a higher risk level may indicate that the website is more likely to be malicious.

In some embodiments, a mathematical formula or procedure for determining a trust level for a website may be strategically determined based on various factors. In some embodiments, one or more of the considerations discussed in the following paragraphs may be used to determine a trust level for the website.

In some embodiments, the source code used to create the website may be analyzed to determine whether the website is possibly malicious. For example, a determination may be made as to whether the website source code includes hotlinks to remotely hosted images. As another example, a determination may be made as to whether the website source code includes suspect text words or phrases, such as the word "login." As yet another example, a determination may be made as to whether the website source code includes unauthorized use of images.

In some embodiments, the detection of content such as media or source code that exists on a well-known, trusted website may decrease the trust level of the website. For example, if a portion of the hosted website is similar to a portion of the website of a Fortune 100 or Fortune 1000 website, then the hosted website may be involved in a phishing attack in which the hosted website simulates the well-known website in an attempt to elicit private information from users of the hosted website.

In some embodiments, the detection of links from the website to known malicious websites may decrease the trust level of the website. For instance, the source code used to create the website may be analyzed to determine if it contain links to known malicious sites. As another example, the website as served to client machines (e.g., the client-side code) may be analyzed to determine if it contain links to known malicious sites.

In some embodiments, the detection of links from the website to well-known, trusted websites may increase the trust level of the hosted website. For instance, links to Fortune 100 or Fortune 1000 websites may indicate information or business activities rather than malicious activities.

In some embodiments, the detection of a login page on the website other than a login page provided by the hosting provider may decrease the trust level of the website. Such pages may be indicative of phishing activities in which an author of the malicious website is attempting to elicit private login information from users of the website.

In some embodiments, the detection of links from the website to executable files, batch files, or other files that may be executed by a client machine may decrease the trust level of the website. Executable files may include viruses, worms, spyware, Trojans, or other malicious software. Thus, the source code used to create the website may be analyzed to determine if it contain links to executables.

In some embodiments, a website that is edited over a period of time may be afforded a higher level of trust. In many cases, malicious websites are created in a short period of time and then eventually discarded. That is, a user may upload a file or set of files to the web hosting provider and make only minimal changes to the files. In contrast, developers of non-malicious websites often make many changes to the websites over many days. Thus, activity editing or modifying the website over a period of time may improve the trust level for the website. One exception to this rule is that some websites may have a development system in which the website is edited and modified and a production system in which the website is provided to end users. The presence of such a setup may be identified by receiving an explicit indication from a user, by detecting an interlinking between different hosted addresses, or by any other mechanism. If the presence of such a system is detected, then a lack of editing on the production account may not be treated as reducing a level of trust in the website.

In some embodiments, the detection of obfuscation techniques may reduce the trust level of a website. Obfuscation techniques may include any procedures or mechanisms to conceal the source code used to generate a displayed webpage, conceal communications involving the webpage, conceal data communicated by the webpage, or conceal any other aspect of the operation or creation of the webpage. In many cases, obfuscation techniques are used by malicious website operators in order to confuse client side security tools and/or users attempting to reverse engineer the inner workings of the website. In some embodiments, obfuscation techniques may be detected by identifying the presence of JavaScript® unpacking routines, code that hides references to commonly used JavaScript® functions, or unusual patterns in function calls (e.g., relatively high numbers of calls to eval( )).

In some embodiments, a website that imposes a condition on rendering may be afforded a lower level of trust. A condition on rendering includes any conditional mechanism by which a website appears differently based on the identity of a user requesting the website, an identity of a previous website visited by the user, an identity of a network location from which the request for the website originated, an identity of a web browser from which the request for the website originated, or on some other factor.

For example, a malicious website may use a phishing attack to solicit private data from users associated with a legitimate website, such as eBay. In this case, the malicious website may appear to have a user interface similar to eBay to trick users into divulging their usernames and passwords. However, if eBay employees were to investigate the malicious website, then the ruse would be quickly detected. Thus, the malicious website may impose a condition in the source code used to generate the malicious website. The condition may specify that if a request for the malicious website is received from a server associated with the legitimate website, such as eBay, then the malicious website should render as a benign website so that a service provider of the legitimate website does not detect the malicious activity.

As another example, a malicious website may display content conditionally based on the web browser used to view the website. In this case, malicious content may be provided to browsers that have exploitable security flaws, while non-malicious content may be provided to more secure browsers. Web browsers that have exploitable security flaws may include older versions of web browsers that have not been updated to include security patches and other protections afforded by many new web browsers In some embodiments, a condition on rendering may be detected by analyzing the source code used to create the website, by comparing the rendered website in response to requests from different requester addresses, or by some other technique. If a condition on rendering is detected, then the trust level afforded to the website may be reduced.

In some embodiments, communication between the hosted website and external servers may affect the trust level in the hosted website. In some cases, such communication may be used by malicious websites to transmit information acquired through phishing, to download new malicious software for sending to host computers, or to receive instructions for malicious activities. However, non-malicious websites may also communicate with external websites for various legitimate reasons. Accordingly, the communication between the hosted website and external servers may be analyzed to determine whether it is indicative of malicious activities.

For example, communication with known good servers such as websites associated with Fortune 1000 companies is unlikely to indicate malicious activity. On the other hand, communication with IP addresses or network shares indicate that malicious activity may be occurring. Likewise, communication over non-standard ports (e.g., ports other than ports 80 and 443) may indicate malicious activity. Further, communication with servers known to be associated with malicious activity may provide an indication of malicious activity by the hosted website.

At 310, a combined trust level is determined. In some embodiments, the combined trust level may be based on the first and second trust levels. The technique used to create the combined trust level may be strategically determined based on the data ranges used to create the first and second trust levels. For instance, the first and second trust levels may each be values on a scale of 0 to 1, where 0 indicates a lower level of trust and 1 indicates a higher level of trust. In this case, the first and second trust levels may be averaged to create the combined trust level, which would then also be a value on a scale of 0 to 1. However, various techniques and data ranges may be used to implement the trust levels, so various techniques may be used to combine the different trust levels to create a combined trust level.

At 312, a determination is made as to whether the combined trust level meets the designated trust threshold value. The determination may be made by comparing the trust level with the designated trust threshold value.

If the combined trust level does meet the designated trust threshold value, then at 314 an indication that the website is trusted is provided. In some embodiments, an indication of the trustworthiness of the website may be transmitted to a user associated with the creation or maintenance of the website. Additionally, or alternately, the website may be permitted to post a notification such as a seal or icon indicating that the website has been analyzed and deemed trustworthy.

If instead the combined trust level does not meet the designated trust threshold value, then at 314 an indication that the website is not trusted is provided. Regardless of the outcome of the determination at 312, the determination as to whether the web site is trusted may be stored on a storage device associated with the website hosting system.

In some embodiments, a website that is determined to be untrustworthy may be subjected to further analysis. For instance, a user may visit the website to review its contents, an administrator may review the source code used to create the website, or the website may be sent to an external service for further testing.

If the website is deemed malicious, then the website may be removed from the server so that it does not perform any further malicious action. In some embodiments, a website may be removed automatically after the website fails to meet a designated trust threshold value. Alternately, an administrator may decide to remove the website after reviewing the results of automated tools and any other information concerning the website.

In some embodiments, whether a website is removed automatically after it is deemed malicious may depend on the type of malicious behavior detected or the difference between the combined trust level and the designated trust threshold value. For instance, if a website is detected as performing clearly malicious actions such as distributing software known to be malicious, then the website may be removed automatically. As another example, a website may be removed automatically if its combined trust level is far below the designated trust threshold value.

Figure 4:
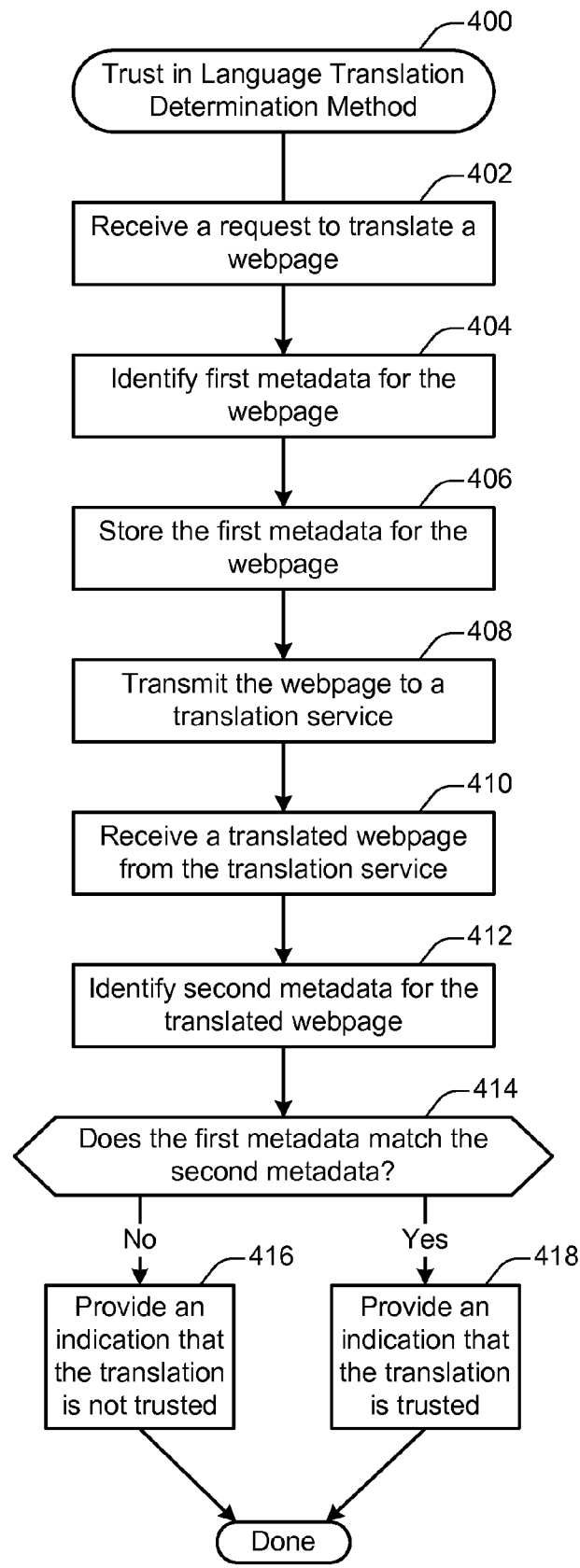
FIG. 4 shows a flow diagram of a method 400 for determining trust in language translation, performed in accordance with one embodiment.

FIG. 4 shows a flow diagram of a method 400 for determining trust in language translation, performed in accordance with one embodiment. In some embodiments, structured or formatted documents such as webpages may need to be transformed for presentation. For example, a webpage may need to be translated from one written language to another written language. As another example, the content of a webpage may require editing. The transformation can include any operations related to changing the content of the document.

In some embodiments, the webpage may be sent to an external service for transformation. The external services may include any services not controlled or not fully trusted by the owner of the webpage or other structured document. For example, the webpage may be sent to a first external service for editing and sent to a second external service for translation from one language to another language.

In some implementations, written language translation or other semantic transformation may occur after content has been processed into a format that included both content and control elements. For example, the format may be a webpage that includes both written language and HTML. Some formats like HTML include active code elements with the control portions that are not visible apparent but can potentially perform malicious actions.

If a resource is transmitted to an untrusted party for translation, the untrusted party can perform malicious alteration of the invisible control portions along with the language translations. These changes could then perform arbitrary malicious actions after inclusion of the resource into a larger software system or web site. In a first example, the external service may alter the webpage to include a link to a malicious file such as a virus, Trojan, worm, or other malicious software program. In a second example, the external service may alter the webpage to include a form designed to receive confidential information from users and pass the information to a malicious party. In a third example, the external service may insert into the webpage malicious code that redirects a web browser to another malicious webpage such as a webpage controlled by the external service. In a fourth example, the external service may insert into the webpage malicious code that attempts to retrieve private information from a web browser such as browsing history, login status of other websites, or stored usernames and passwords. In a fifth example, the external service may insert into the webpage malicious code that attempts to directly exploit weaknesses in a client web browser. In a sixth example, the external service may insert into the webpage malicious code that attempts to directly exploit weaknesses in software, such as a plug-in, installed in a client web browser.

In some implementations, the method 400 may be used to determine trust in a transformed structured document even in cases where little is known about the structured document and/or the transformation performed by the external service. In some instances, the service provider or webpage author may know relatively little about the structured document sent to the external services. For example, the service provider may not know how the structured document was created or whether the structured document is well-formed or free of errors. In some instances, the service provider or webpage author may know relatively little about the transformation performed by the external service. For example, the external service may or may not transform HTML hovertext, URIs, alternate text for images or other media, or other portions of the structured documents.

The method 400 shown in FIG. 4 may be used to determine whether a webpage, or any other structured resource having data and metadata, may have been maliciously altered during a transformation. The transformation may include translation of a written language, semantic manipulation, or any other type of data transformation altering the webpage. The translation may be performed by an untrusted or partially trusted party.

At 402, a request to translate a webpage is received. In some embodiments, the request may be received at a computing device. The computing device may be associated with the web hosting service provider or with an owner of the webpage. The computing device may be used to analyze webpages hosted at the hosting provider.

In some embodiments, the request to evaluate the webpage may be received as part of an automatic procedure. For example, the hosting provider may automatically translate a webpage or group of webpages into another language. As another example, the website owner may automatically submit a webpage or group of webpages to an external service for editing.

In some embodiments, the request to translate the webpage may be generated based on a detected or automated event. For example, a webpage may be automatically translated when it is created, when a designated time has elapsed since the creation of the webpage, when a designated traffic threshold for the webpage has been surpassed, or when any other designated event is detected.

In some embodiments, the webpage may be a primarily static webpage in which the content of the webpage is hard coded into the control sequences. Alternately, or additionally, the webpage may include dynamic portions.

At 404, first metadata for the webpage is identified. The first metadata may be identified by analyzing a formatted webpage or other structured document. A webpage or other structured document may be logically divided into a content portion and a control portion. The content portion may include the information displayed by the webpage, while the control portion may include style or formatting information, links, forms for submitting information to a server, scripting language instructions, and other control sequences. In some embodiments, the translation or transformation of the webpage may be expected to change only or primarily the content of the webpage, not the control sequences. The control sequences can include HTML, XML, JavaScript®, or other markup tags in the webpage.

In some embodiments, the metadata may be determined by analyzing the webpage, including the control sequences. The metadata to use for comparison may be strategically determined based on the type of documents that are being compared, the type of control sequences included in the documents, and a desired degree of security or trust.

For example, the metadata can include counts of different control sequences, numbers of key attributes, attribute values, or any other key statistics or control sequence information. The metadata may include an indication tags in the website that may be easily abused, such as the HTML onclick attribute tag. The metadata may include an indication of links to websites other than websites controlled by the website owner. The metadata may include an indication of links to websites other than the website itself. The metadata may include an indication of domains linked to by the website that are not controlled by the website owner. The metadata may include an indication of the content of script tags. The metadata may include selective checksums of portions of the webpage. For example, the metadata may include a checksum of the website after the website is stripped of content. The metadata may include an Extensible Stylesheet Language Transformations (XLST) and/or Extensible Markup Language (XML) signature.

In some embodiments, the metadata values may be recorded as unaltered values, as checksum values, as encrypted values, as hashed values, or in any other way. The type and results of the analysis may be stored as metadata. The metadata may be stored along with a unique identifier for the page.

At 406, the first metadata for the webpage is stored. In some embodiments, the metadata may be stored at a storage device accessible to the website creator or the website hosting provider. For example, the metadata may be stored in a database, in a content management system (CMS), or in some other storage location.

In some embodiments, the metadata may be encrypted or hashed and transmitted with the webpage. In this case, the metadata may be encrypted using a symmetric key stored at the server, an identifier associated with the webpage (e.g., a URI), and/or a salt value. Techniques for transmitting encrypted information with a communication to a possibly untrusted source are discussed in greater detail in co-pending and commonly assigned U.S. patent application Ser. No. 13/005,073 by Dapkus et al., titled "Secure Communications," filed Jan. 11, 2011, which is incorporated herein by reference in its entirety and for all purposes.

At 408, the webpage is transmitted to a translation service. In some embodiments, the translation service may be an external service that is not controlled by the webpage author, the webpage web hosting provider, or another trusted party. Thus, the translation service may not be fully trusted.

In some embodiments, the untranslated webpage may be transmitted to the translation service in an individual message. Alternately, the untranslated webpage may be transmitted to in a combined message with other untranslated webpages.

In some embodiments, the translation service may perform any modification of the data in the webpage or resource transmitted to the translation service. For example, the translation service may translate written language in the webpage written in a first language to written language in a second language. As another example, the translation service may edit, proof, or otherwise alter written language in a first language. As yet another example, the translation service may insert material such as advertisements. As long as the translation service is not expected to perform a modification or transformation of the resource that significantly alters the metadata used to verify that the modification was not malicious, any sort of modification or transformation may be performed by the translation service.

At 410, the translated webpage is received from the translation service. In some embodiments, the translated webpage may be received from the translation service in an individual message. Alternately, the translated webpage may be received in a combined message with other translated webpages.

At 412, second metadata is identified for the translated webpage. A similar analysis may be performed on the translated webpage so that the same types of metadata identified for the untranslated webpage are identified for the translated webpage. In some embodiments, the procedure for identifying the second metadata may be substantially similar to the procedure for identifying the first metadata at 404.

At 414, a determination is made as to whether the first metadata matches the second metadata. In some embodiments, the first and second metadata may need to be an exact match for the determination at 414 to yield a match. Alternately, a relatively minor mismatch between the two sets of metadata may not trigger a mismatch. The degree of similarity required between the first and second metadata and the procedure for comparing the first and second metadata may be strategically determined based on the type of metadata being compared, the security requirements for the translated webpage, the trust afforded to the translation service, and any other factors.

If the first metadata was encrypted or hashed, then the metadata may need to be re-hashed or decrypted when the translated webpage is received, in order to facilitate making a comparison. If instead the first metadata was stored in a storage device, then the stored metadata may be retrieved when the translated webpage is received.

At 416, an indication that the translation is not trusted may be provided. The indication that the translation is not trusted may be transmitted in a message, stored on a storage device, or conveyed in any other way.

In some embodiments, the indication that the translation is not trusted may be transmitted to a user such as an administrator. The indication may specify differences between the two sets of metadata. The administrator may review the translated webpage and/or the differences between the two sets of metadata and determine whether to take further action.

If instead the first and second metadata match, then at 418 an indication is provided that the translation is trusted. Regardless of the outcome of the determination made at 414, the indication provided at 416 or 418 may be stored on a storage device, transmitted in a message, recorded in a log, or provided in any other way.

Figure 5A:
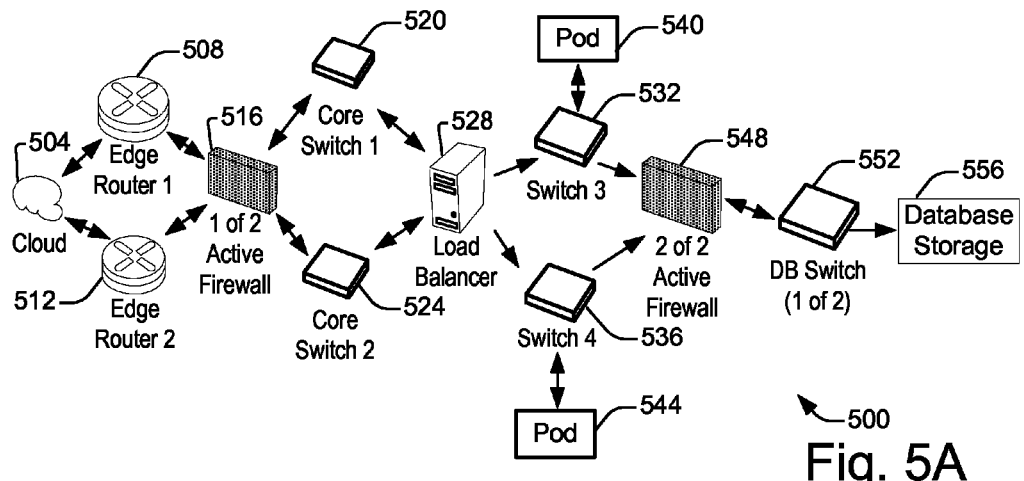
FIG. 5A shows a system diagram 500 illustrating architectural components of an on-demand service environment, in accordance with one embodiment.

FIG. 5A shows a system diagram 500 illustrating architectural components of an on-demand service environment, in accordance with one embodiment.

A client machine located in the cloud 504 (or Internet) may communicate with the on-demand service environment via one or more edge routers 508 and 512. The edge routers may communicate with one or more core switches 520 and 524 via firewall 516. The core switches may communicate with a load balancer 528, which may distribute server load over different pods, such as the pods 540 and 544. The pods 540 and 544, which may each include one or more servers and/or other computing resources, may perform data processing and other operations used to provide on-demand services. Communication with the pods may be conducted via pod switches 532 and 536. Components of the on-demand service environment may communicate with a database storage system 556 via a database firewall 548 and a database switch 552.

Figure 5B:
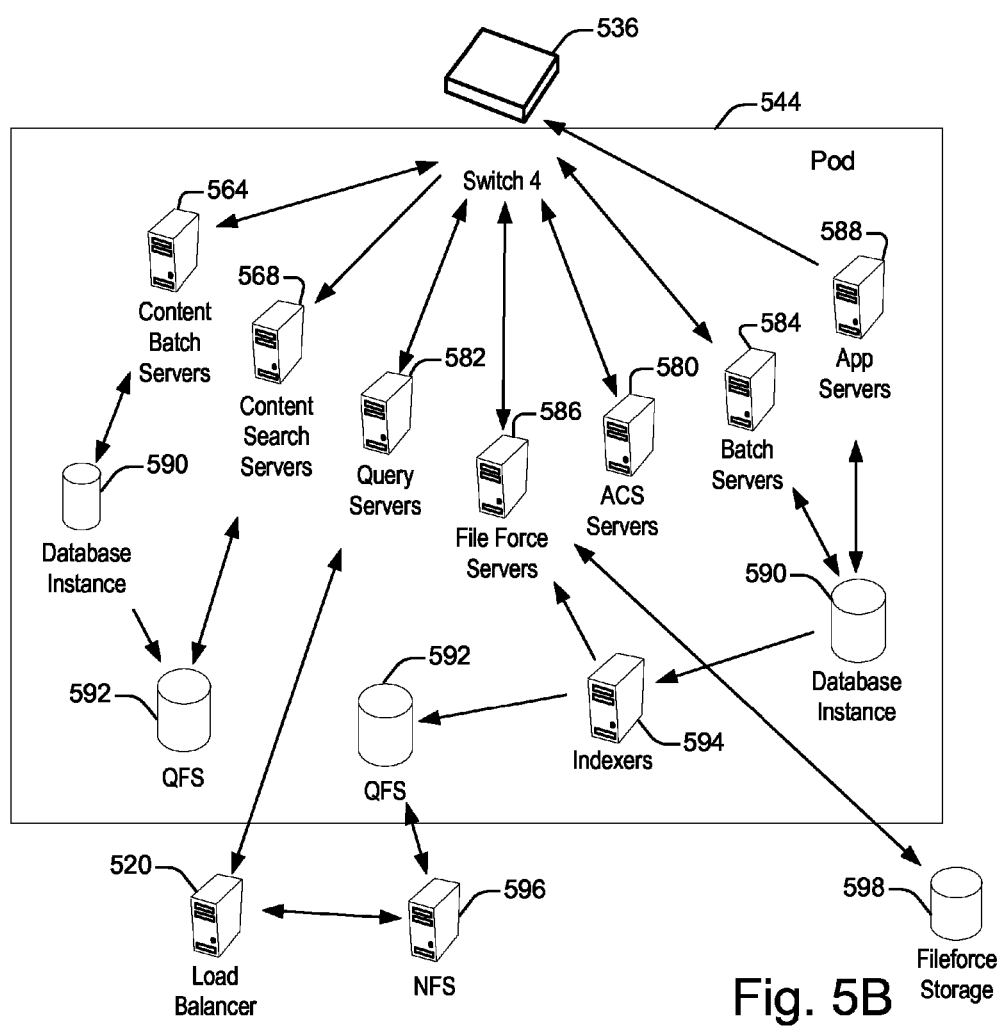
FIG. 5B shows a system diagram further illustrating architectural components of an on-demand service environment, in accordance with one embodiment.

As shown in FIGS. 5A and 5B, accessing an on-demand service environment may involve communications transmitted among a variety of different hardware and/or software components. Further, the on-demand service environment 500 is a simplified representation of an actual on-demand service environment. For example, while only one or two devices of each type are shown in FIGS. 5A and 5B, some embodiments of an on-demand service environment may include anywhere from one to many devices of each type. Also, the on-demand service environment need not include each device shown in FIGS. 5A and 5B, or may include additional devices not shown in FIGS. 5A and 5B.

Moreover, one or more of the devices in the on-demand service environment 500 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 504 is intended to refer to a data network or plurality of data networks, often including the Internet. Client machines located in the cloud 504 may communicate with the on-demand service environment to access services provided by the on-demand service environment. For example, client machines may access the on-demand service environment to retrieve, store, edit, and/or process information.

In some embodiments, the edge routers 508 and 512 route packets between the cloud 504 and other components of the on-demand service environment 500. The edge routers 508 and 512 may employ the Border Gateway Protocol (BGP). The BGP is the core routing protocol of the Internet. The edge routers 508 and 512 may maintain a table of IP networks or 'prefixes' which designate network reachability among autonomous systems on the Internet.

In one or more embodiments, the firewall 516 may protect the inner components of the on-demand service environment 500 from Internet traffic. The firewall 516 may block, permit, or deny access to the inner components of the on-demand service environment 500 based upon a set of rules and other criteria. The firewall 516 may act as one or more of a packet filter, an application gateway, a stateful filter, a proxy server, or any other type of firewall.

In some embodiments, the core switches 520 and 524 are high-capacity switches that transfer packets within the on-demand service environment 500. The core switches 520 and 524 may be configured as network bridges that quickly route data between different components within the on-demand service environment. In some embodiments, the use of two or more core switches 520 and 524 may provide redundancy and/or reduced latency.

In some embodiments, the pods 540 and 544 may perform the core data processing and service functions provided by the on-demand service environment. Each pod may include various types of hardware and/or software computing resources. An example of the pod architecture is discussed in greater detail with reference to FIG. 5B.

In some embodiments, communication between the pods 540 and 544 may be conducted via the pod switches 532 and 536. The pod switches 532 and 536 may facilitate communication between the pods 540 and 544 and client machines located in the cloud 504, for example via core switches 520 and 524. Also, the pod switches 532 and 536 may facilitate communication between the pods 540 and 544 and the database storage 556.

In some embodiments, the load balancer 528 may distribute workload between the pods 540 and 544. Balancing the on-demand service requests between the pods may assist in improving the use of resources, increasing throughput, reducing response times, and/or reducing overhead. The load balancer 528 may include multilayer switches to analyze and forward traffic.

In some embodiments, access to the database storage 556 may be guarded by a database firewall 548. The database firewall 548 may act as a computer application firewall operating at the database application layer of a protocol stack. The database firewall 548 may protect the database storage 556 from application attacks such as structure query language (SQL) injection, database rootkits, and unauthorized information disclosure.

In some embodiments, the database firewall 548 may include a host using one or more forms of reverse proxy services to proxy traffic before passing it to a gateway router. The database firewall 548 may inspect the contents of database traffic and block certain content or database requests. The database firewall 548 may work on the SQL application level atop the TCP/IP stack, managing applications' connection to the database or SQL management interfaces as well as intercepting and enforcing packets traveling to or from a database network or application interface.

In some embodiments, communication with the database storage system 556 may be conducted via the database switch 552. The multi-tenant database system 556 may include more than one hardware and/or software components for handling database queries. Accordingly, the database switch 552 may direct database queries transmitted by other components of the on-demand service environment (e.g., the pods 540 and 544) to the correct components within the database storage system 556.

In some embodiments, the database storage system 556 is an on-demand database system shared by many different organizations. The on-demand database system may employ a multi-tenant approach, a virtualized approach, or any other type of database approach. An on-demand database system is discussed in greater detail with reference to FIGS. 6 and 7.

FIG. 5B shows a system diagram illustrating the architecture of the pod 544, in accordance with one embodiment. The pod 544 may be used to render services to a user of the on-demand service environment 500.

In some embodiments, each pod may include a variety of servers and/or other systems. The pod 544 includes one or more content batch servers 564, content search servers 568, query servers 572, file force servers 576, access control system (ACS) servers 580, batch servers 584, and app servers 588. Also, the pod 544 includes database instances 590, quick file systems (QFS) 592, and indexers 594. In one or more embodiments, some or all communication between the servers in the pod 544 may be transmitted via the switch 536.

In some embodiments, the application servers 588 may include a hardware and/or software framework dedicated to the execution of procedures (e.g., programs, routines, scripts) for supporting the construction of applications provided by the on-demand service environment 500 via the pod 544. Some such procedures may include operations for providing the services described herein.

The content batch servers 564 may requests internal to the pod. These requests may be long-running and/or not tied to a particular customer. For example, the content batch servers 564 may handle requests related to log mining, cleanup work, and maintenance tasks.

The content search servers 568 may provide query and indexer functions. For example, the functions provided by the content search servers 568 may allow users to search through content stored in the on-demand service environment.

The Fileforce servers 576 may manage requests information stored in the Fileforce storage 578. The Fileforce storage 578 may store information such as documents, images, and basic large objects (BLOBs). By managing requests for information using the Fileforce servers 576, the image footprint on the database may be reduced.

The query servers 572 may be used to retrieve information from one or more file systems. For example, the query system 572 may receive requests for information from the app servers 588 and then transmit information queries to the NFS 596 located outside the pod.

The pod 544 may share a database instance 590 configured as a multi-tenant environment in which different organizations share access to the same database. Additionally, services rendered by the pod 544 may require various hardware and/or software resources. In some embodiments, the ACS servers 580 may control access to data, hardware resources, or software resources.

In some embodiments, the batch servers 584 may process batch jobs, which are used to run tasks at specified times. Thus, the batch servers 584 may transmit instructions to other servers, such as the app servers 588, to trigger the batch jobs.

In some embodiments, the QFS 592 may be an open source file system available from Sun Microsystems® of Santa Clara, Calif. The QFS may serve as a rapid-access file system for storing and accessing information available within the pod 544. The QFS 592 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 568 and/or indexers 594 to identify, retrieve, move, and/or update data stored in the network file systems 596 and/or other storage systems.

In some embodiments, one or more query servers 572 may communicate with the NFS 596 to retrieve and/or update information stored outside of the pod 544. The NFS 596 may allow servers located in the pod 544 to access information to access files over a network in a manner similar to how local storage is accessed.

In some embodiments, queries from the query servers 522 may be transmitted to the NFS 596 via the load balancer 520, which may distribute resource requests over various resources available in the on-demand service environment. The NFS 596 may also communicate with the QFS 592 to update the information stored on the NFS 596 and/or to provide information to the QFS 592 for use by servers located within the pod 544.

In some embodiments, the pod may include one or more database instances 590. The database instance 590 may transmit information to the QFS 592. When information is transmitted to the QFS, it may be available for use by servers within the pod 544 without requiring an additional database call.

In some embodiments, database information may be transmitted to the indexer 594. Indexer 594 may provide an index of information available in the database 590 and/or QFS 592. The index information may be provided to file force servers 576 and/or the QFS 592.

FIG. 6 shows a block diagram of an environment 610 wherein an on-demand database service might be used, in accordance with one embodiment.

Figure 7:
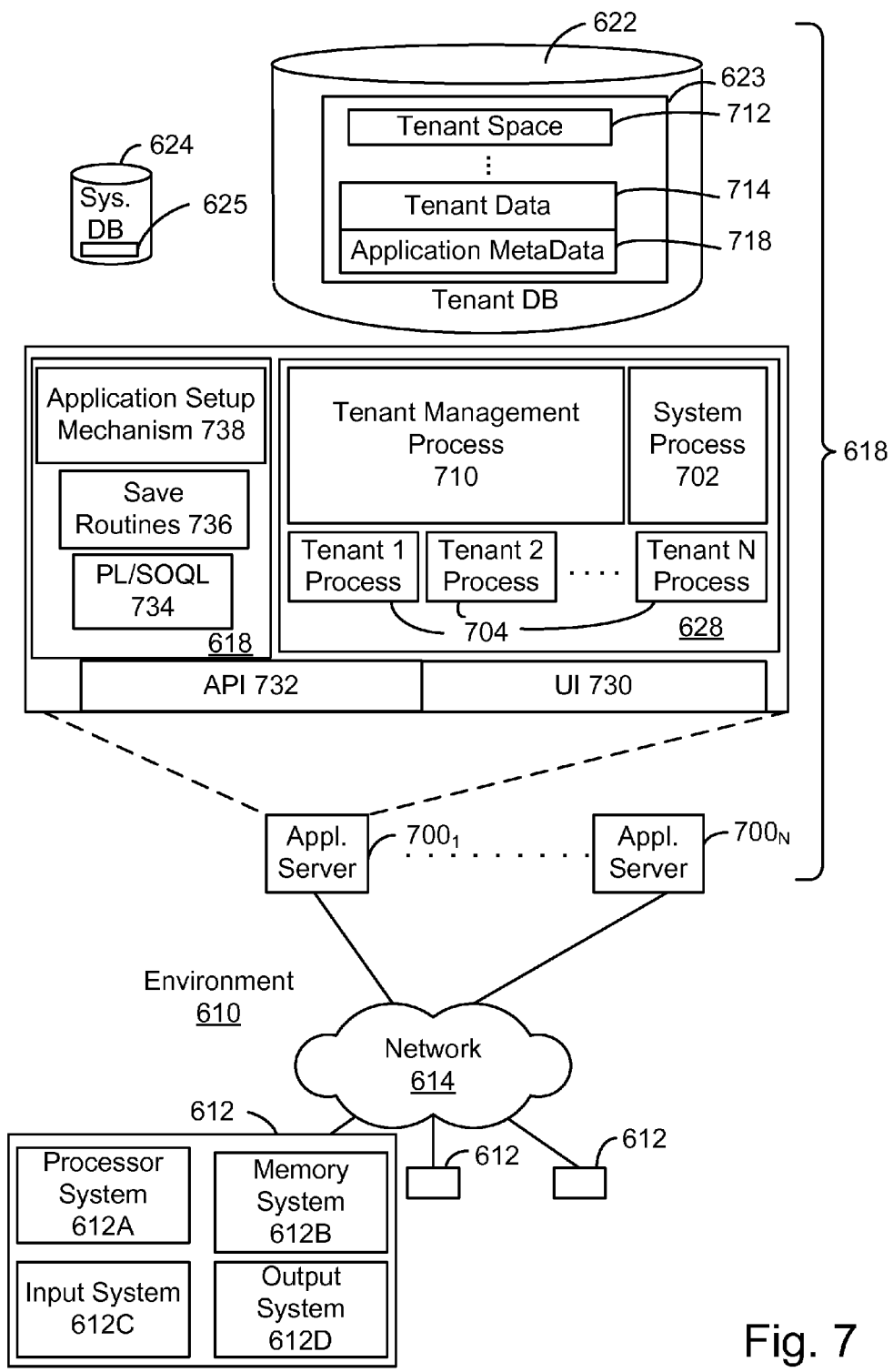
FIG. 7 shows a system diagram 610 further illustrating the architecture of a multitenant database environment, in accordance with one embodiment.

Environment 610 includes an on-demand database service 616. User system 612 may be any machine or system that is used by a user to access a database user system. For example, any of user systems 612 can be a handheld computing device, a mobile phone, a laptop computer, a work station, and/or a network of computing devices. As illustrated in FIGS. 6 and 7, user systems 612 might interact via a network 614 with the on-demand database service 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS).

Accordingly, "on-demand database service 616" and "system 616" will be used interchangeably herein. A database image may include one or more database objects. A relational database management system (RDBMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

The users of user systems 612 may differ in their respective capacities, and the capacity of a particular user system 612 might be entirely determined by permissions (permission levels) for the current user. For example, where a call center agent is using a particular user system 612 to interact with system 616, the user system 612 has the capacities allotted to that call center agent. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some embodiments are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications. User (or third party developer) applications, which may or may not include CRM, may be supported by the application platform 618, which manages creation, storage of the applications into one or more database objects and executing of the applications in a virtual machine in the process space of the system 616.

Each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614.

Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application (s) including computer code to run using a central processing unit such as processor system 617, which may include an Intel Pentium® processor or the like, and/or multiple processor units.

A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing embodiments can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 7 also shows a block diagram of environment 610 further illustrating system 616 and various interconnections, in accordance with one embodiment. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers 7001-700N, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of processors. Memory system 612B may be any combination of one or more memory devices, short term, and/or long term memory. Input system 612C may be any combination of input devices, such as keyboards, mice, trackballs, scanners, cameras, and/or interfaces to networks. Output system 612D may be any combination of output devices, such as monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as Oracle™ databases.

Application platform 618 includes an application setup mechanism 738 that supports application developers' creation and management of applications, which may be saved as metadata into tenant data storage 622 by save routines 736 for execution by subscribers as tenant process spaces 704 managed by tenant management process 710 for example. Invocations to such applications may be coded using PL/SOQL 34 that provides a programming language style interface extension to API 732. A detailed description of some PL/SOQL language embodiments is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is hereby incorporated by reference in its entirety and for all purposes. Invocations to applications may be detected by system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server 7001 might be coupled via the network 614 (e.g., the Internet), another application server 700N-1 might be coupled via a direct network link, and another application server 700N might be coupled by yet a different network connection. Transfer Control Protocol and Internet Protocol (TCP/IP) are typical protocols for communicating between application servers 700 and the database system. However, other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each call center agent uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client machines/systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some embodiments. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some embodiments, for example, all custom entity data rows are stored in a single multi-tenant physical table, which may contain multiple logical tables per organization. In some embodiments, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more implementations and techniques are described with reference to an embodiment in which a service cloud console is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While various embodiments have been described herein, it should be understood that they have been presented by way of example only, and not limitation. Thus, the breadth and scope of the present application should not be limited by any of the embodiments described herein, but should be defined only in accordance with the following and later-submitted claims and their equivalents.

What is claimed is:

1. A method of determining a combined trust level for a website, the method comprising:

analyzing a user account associated with the creation or server side maintenance of the website, the analysis of the user account being capable of identifying the presence or absence of a first risk factor affecting a likelihood that the user account is engaged in a malicious activity;

analyzing a source code file associated with the website, the source code file capable of being used to create a message for sending to a remote computing device, the analysis of the source code file being capable of identifying the presence or absence of a second risk factor affecting a likelihood that the source code file is facilitating a malicious activity; and based on the analysis of the user account and the analysis of the source code file, determining the combined trust level for the website, the combined trust level indicating a likelihood that the website is not engaged in a malicious activity.

2. The method recited in claim 1, the method further comprising:
   analyzing a communication transmitted or received by the website, the analysis of the communication being capable of identifying the presence or absence of a third risk factor affecting a likelihood that the communication is involved in a malicious activity.

3. The method recited in claim 2, wherein the communication comprises a webpage transmitted from the website to a client machine, wherein identifying the presence or absence of the third risk factor comprises determining whether the webpage is obfuscated, and wherein a determination that the webpage is obfuscated results in a relatively lesser combined trust level.

4. The method recited in claim 1, wherein analyzing the user account comprises:
   determining an interval of time between a creation date of the user account and a creation date of the website, wherein a relatively greater interval of time results in a relatively greater combined trust level.

5. The method recited in claim 1, wherein analyzing the user account comprises:
   determining an activity frequency for the user account, the activity frequency indicating an occurrence of interaction between the user account and the website, wherein a relatively greater activity frequency results in a relatively greater combined trust level.

6. The method recited in claim 1, wherein analyzing the user account comprises:
   identifying a second website, the user account being associated with the creation or maintenance of the second website;
   determining a second combined trust level for the second website, wherein the second combined trust level for the second website affects the combined trust level for the website.

7. The method recited in claim 1, wherein analyzing the source code file comprises:
   identifying a hyperlink within the source code, the hyperlink being addressed to a public network location; and
   determining whether the public network location is in a list of designated public network locations, wherein the presence or absence of the public network location in the list of designated public network locations affects the combined trust level.

8. The method recited in claim 1, the method further comprising:
   determining whether the combined trust level meets a designated trust level threshold value; and
   when the combined trust level does not meet the designated trust threshold value, storing an indication that the website is likely to be participating in a malicious activity.

9. The method recited in claim 8,
   wherein the indication is stored in a multitenant database accessible to a plurality of tenants via an on-demand computing services environment.

10. One or more non-transitory computer readable media having instructions stored thereon for performing a method of determining a combined trust level for a website, the method comprising:
   analyzing a user account associated with the creation or server side maintenance of the website, the analysis of the user account being capable of identifying the presence or absence of a first risk factor affecting a likelihood that the user account is engaged in a malicious activity;
   analyzing a source code file associated with the website, the source code file capable of being used to create a message for sending to a remote computing device, the analysis of the source code file being capable of identifying the presence or absence of a second risk factor affecting a likelihood that the source code file is facilitating a malicious activity; and
   based on the analysis of the user account and the analysis of the source code file, determining a combined trust level for the website, the combined trust level indicating a likelihood that the website is not engaged in a malicious activity.

11. The one or more non-transitory computer readable media recited in claim 10, the method further comprising:
   analyzing a communication transmitted or received by the website, the analysis of the communication being capable of identifying the presence or absence of a third risk factor affecting a likelihood that the communication is facilitating a malicious activity.

12. The one or more non-transitory computer readable media recited in claim 11, wherein the communication comprises a webpage transmitted from the website to a client machine, wherein identifying the presence or absence of the third risk factor comprises determining whether the webpage is obfuscated, and wherein a determination that the webpage is obfuscated results in a relatively lesser combined trust level.

13. The one or more non-transitory computer readable media recited in claim 10, wherein analyzing the user account comprises:
   determining an interval of time between a creation date of the user account and a creation date of the website, wherein a relatively greater interval of time results in a relatively greater combined trust level.

14. The one or more non-transitory computer readable media recited in claim 10, wherein analyzing the user account comprises:
   determining an activity frequency for the user account, the activity frequency indicating an occurrence of interaction between the user account and the website, wherein a relatively greater activity frequency results in a relatively greater combined trust level.

* * * * *